May 13, 1941.   E. E. BATES   2,241,941
ANGLING LURE
Filed Aug. 12, 1938
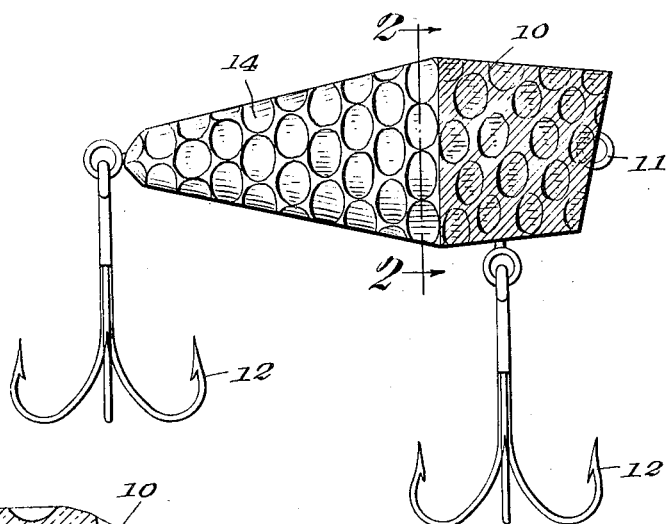
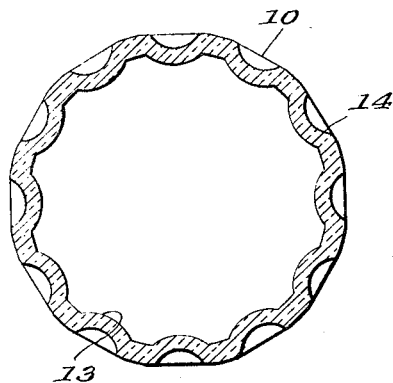
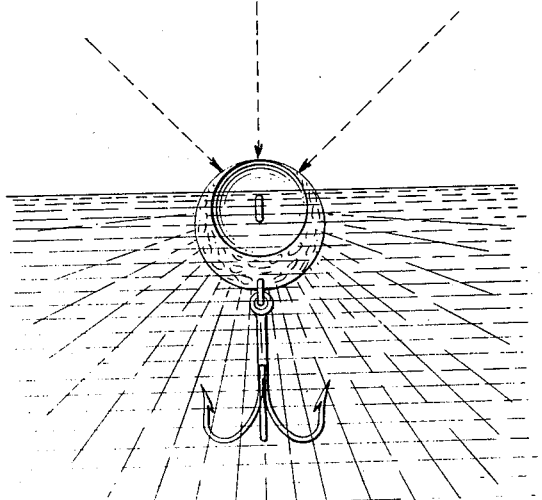
INVENTOR.
Edmond E. Bates
BY Spear, Rawlings & Spear,
ATTORNEYS.

Patented May 13, 1941

2,241,941

UNITED STATES PATENT OFFICE 2,241,941

ANGLING LURE

Edmond E. Bates, Carlisle, Mass.

Application August 12, 1938, Serial No. 224,531

1 Claim. (Cl. 43—46)

This invention relates to a bait body or artificial lure molded from a plastic composition which is transparent or semi-transparent, or at least translucent, so that light shining on the lure as it is drawn through the water or floats at the surface is refracted as it passes through the lure, and under water appears as an image of the lure which attracts the fish and induces it to strike.

My lure is hollow. It is molded to the desired shape and during the molding operation has formed therein a plurality of external surface irregularities or concavities which give a fish-like appearance to the lure in use.

These irregularities or concavities may be arranged in any desired pattern to simulate the scales, and/or skin markings, or skeletal structure of a fish. When the lure is in use, these irregularities or concavities act as reflectors for the light shining on and through the lure and give the effect of life or motion to the lure.

The lure also has molded internally thereof a plurality of relatively shallow convexities which, in the use of the lure act to refract the light shining on the lure.

The lure itself may be molded in any desired colors or color combinations and in any desired shape. In the accompanying drawing, it is shown as a two-colored hollow body of conventional plug shape.

Throughout the specification and drawing like reference characters are employed to indicate corresponding parts, and in the drawing:

Fig. 1 is a side elevation of my lure.

Fig. 2 is an enlarged section on the line 2—2, of Fig. 1.

Fig. 3 is an end view diagrammatically showing my lure in use.

My artificial lure comprises a hollow body 10, and is molded in any desired shape and in one or more sections from any of the well known plastic molding compositions now on the market such as "Plastacele." It is transparent or semi-transparent or at least translucent, and preferably the plastic material from which it is molded is of permanent color.

The lure may be fitted with a leading ring or eye 11 and one or more hooks 12.

During the molding process, I form on and in the lure a plurality of surface irregularities or facets 13 and 14. The external irregularities 14 may simulate the scales of the fish, and are formed as relatively shallow concavities. The internal irregularities 13 are formed as convexities. Preferably the concavities and convexities are arranged in pairs with the concavities and convexities of each pair opposite one another.

In use, my lure may be drawn through the water submerged or skittered or allowed to float on the surface. Light impinging upon the lure is reflected by the external concavities 14 and refracted by the internal convexities 13 (see Fig. 3), and to the fish about to strike the bait simulates the skin or skeletal structure of a fish as well as giving the effect of life or motion thereto. Such refracted light as it passes through the bait appears under water as a colored image or shadow which appears as a sub-natant accompaniment of the moving lure.

A subjacent fish rising to strike the lure, rises through a slightly colored aurora or under-surface beam which, while not a physical wake, shadows the lure and increases its visibility, assisting the fish to strike true and not rise short so as to be pricked and lost.

What I therefore claim and desire to secure by Letters Patent is:

A fish lure, comprising a hollow body of molded translucent material having integrally formed therein a multiplicity of external light-reflecting concavities simulative of the body appearance of a fish and having integrally formed therein a plurality of internal light-refracting convexities, the concavities and convexities being arranged in pairs with the concavities and convexities of each pair opposite one another.

EDMOND E. BATES.